United States Patent Office 3,454,364
Patented July 8, 1969

3,454,364
USE OF RANEY NICKEL FOR OBTAINING HYDROGEN
Ferdinand v. Sturm and Kurt Mager, Erlangen, Germany, assignors to Siemens Aktiengesellschaft, Berlin, Germany, a corporation of Germany
No Drawing. Filed Mar. 14, 1966, Ser. No. 533,836
Claims priority, application Germany, Mar. 13, 1965, 395,939
Int. Cl. C01b 1/16
U.S. Cl. 23—212                                10 Claims

ABSTRACT OF THE DISCLOSURE

Described is a process for the catalytic vapor reformation of hydrocarbons or saturated aliphatic alcohols. This process comprises contacting the hydrocarbon at a temperature between 600° and 800° C. or the alcohol at a temperature of 300° to 400° C. with a special catalyst. This special catalyst comprises particles of an aluminum-nickel alloy, which have had a few microns of aluminum dissolved away from the surface by an alkali metal hydroxide solution. For example, five microns of aluminum may be dissolved away from the particles having a diameter of 1 to 5 mm.

---

Catalysts for cracking gaseous and liquid hydrocarbons in the presence of water vapor are known. Oxide catalysts consisting of mixtures of oxides of the elements of the 2nd, 3rd and 4th groups of the periodic system, for example, mixtures of $Al_2O_3$, $MgO$ and $SiO_2$ as well as oxide catalysts activated with nickel, cobalt or other metals are suitable for this purpose. It is also known that the reaction course is considerably influenced by the catalyst combination. For example, the oxidic catalysts are definitely cracking catalysts; the contact catalysts which contain a metallic component, activate particularly the dehydration and reformation processes, whereby in the latter instance, the carrier layers comprising $Al_2O_3$ and $SiO_2$ effect the cracking of the hydrocarbons, while the metals function as dehydration catalysts.

Finely distributed metals, especially finely distributed nickel on a $Al_2O_3$-$SiO_2$ carrier are used in the technical production of hydrogen by catalytic vapor reformation of hydrocarbons. Numerous methods have become known for producing the carrier material as well as for the application of the metal and the subsequent activation. These methods are particularly unsuitable, however, if the reforming process is to be carried out on laboratory or other small scale, because of their quite large requirements of time, material and apparatus.

For example, fuel cells operated with hydrogen and oxygen, require apparatus which produces hydrogen at the locality where it is to be used. Naturally, different demands are placed on catalysts used in such installations, than for the catalysts used in large scale installations.

The present invention has as an object overcoming said disadvantages. An object of the present invention is to utilize a Raney-nickel catalyst, from whose surface only a few $\mu$ of aluminum have been removed through the action of aqueous or alcoholic alkali solution to obtain hydrogen through catalytic vapor reforming of hydrocarbons or their oxygen-containing derivatives. The catalysts used according to our invention may be produced by a known method through disintegration of a nickel-aluminum alloy, e.g. a conventional alloy with a ratio nickel:aluminum of 1:1 by weight and immersing the particles obtained into an aqueous or alcoholic alkali solution, preferably a 2–6 N aqueous potassium hydroxide solution, whereby the reaction period at 2 N KOH takes 15–20 minutes and 3–4 minutes for 6 N KOH. Aluminum is thus dissolved at the surface of the metal grains and nickel is left in a catalytically active form following the formation of a new crystal lattice. The alloy which was not attacked by the caustic solution serves as a carrier material for the highly active nickel. After washing off the adhering lye or caustic solution until the wash water gives a neutral reaction, the catalyst is usable as either a fluid bed or solid bed catalyst.

The alkaline action upon the nickel-aluminum alloy is preferably such that only a very thin layer of the highly active nickel forms on the grain surface. A thickness of only several $\mu$ is suitable. This provides a particularly good wear resistance and hence increases the catalyst life.

The nickel-aluminum alloy may have a nickel content of 20 to 80 weight percent, although an alloy with a nickel content of 45 to 55 weight percent is preferred. A granular alloy, whose grain size is about 1–5 mm., is particularly favorable.

It is particularly advantageous to obtain hydrogen by the method according to the invention, in that the Raney-nickel catalyst may be very easily produced, is simple to handle, and well suited for regeneration. Theoretically, Raney-nickel, which is activated all the way through, is also suitable for the production of hydrogen through catalytic vapor reforming of hydrocarbons or their oxygen-containing derivatives. However, in practice, this is without significance. Raney-nickel, which is activated throughout, has first of all the disadvantage of being pyrophoric and having a very low mechanical stability. It is completely unsuitable as a material for a solid bed catalyst. On the other hand, Raney-nickel, which is surface-activated only is no longer self-igniting in air (pyrophoric) and may remain in the open air for as long as desired, without suffering an essential loss of activity.

Compared to the other known methods for producing hydrogen through the use of catalysts, the new contact catalyst is also distinguished by the fact that the carbon deposit on the catalysts, which particularly occurs in small installations during the reaction process, may very easily be removed. In the catalyst of our invention, the carbon deposit occurs exclusively at the grain surface and is easily removed through after-activating in a lye solution, i.e. our new catalyst may be easily regenerated. By contrast, in conventional catalysts, the carbon precipitates in the pores and thereby mechanically destroys the catalyst. As a result, the conventional catalyst must be exchanged in such instances.

The hydrocarbons used, according to our invention, may be saturated, aliphatic, cycloaliphatic, aromatic, and unsaturated hydrocarbons with 1 to 10 carbon atoms. Methane, ethane and propane are especially suitable. The reaction takes place at temperatures between 600 and 800° C.

By oxygen-containing hydrocarbons, we mean aliphatic saturated and unsaturated alcohols, of which methanol, ethanol, and isopropanol are particularly suitable. The optimum temperatures for these hydrocarbons are from 300 to 400° C. The catalytic action of the new catalyst is particularly surprising because of vapor reformation of alcohols.

It is further worthy of mention that one can operate with a very small excess of vapor according to the method of the invention. For example, the optimum mol ratio of water:methane is 2; with methanol, the mol ratio may even be 1:1.

The following examples are given for a more detailed disclosure of the method according to the invention.

Example 1

2% of the aluminum content were removed from 26 g. of aluminum-nickel alloy pieces (50% nickel by weight) by treatment with 6 N KOH 2%.

After washing off the caustic solution until the wash water showed a neutral reaction, the material was placed as a solid body catalyst, into a flow reactor. A gas mixture of methane and water vapor was reacted under atmospheric pressure. The contact layer was 7 cm. long, the volumetric flow rate, relative to methane, amounted to 900 vol./vol./h. The dry reaction gas had the following composition, depending on operational conditions:

| Temperature, °C | 750 | 750 | 650 |
|---|---|---|---|
| Mol ratio, $H_2O:CH_4$ | 3.2 | 3.8 | 3.3 |
| Mol percent: | | | |
| $H_2$ | 76.4 | 76.6 | 75.0 |
| CO | 12.4 | 10.6 | 7.8 |
| $CO_2$ | 9.8 | 11.2 | 12.9 |
| $CH_4$ | 1.4 | 1.6 | 4.3 |
| $H_2$ yield, percent* | 79.5 | 81 | 76 |
| $CH_4$ reaction, percent | 94 | 93 | 8.3 |

*To calculate the $H_2$ yield, the obtained amount $H_2$ is set at a ratio of the amount which would result at a 100% conversion of $CH_4$ into $CO_2$, according to the reaction equation: $CH_4 + 2H_2O \rightarrow CO_2 + 4H_2$

Example 2

Methanol and water vapor were brought to reaction conditions at 350° C., in the same apparatus as in Example 1, over a catalyst charge, which had been pretreated according to Example 1. At a fluid flow rate of 2.7 vol./vol./h. and a $H_2O:CH_3OH$ ratio of 2.7, the $H_2$ yield (relative to 100% conversion of the methanol into $CO_2$) amounted to 72.5%.

The dry reaction gas had the following composition:

67 mol percent $H_2$
1.6 mol percent CO
17.2 mol percent $CO_2$
14.2 mol percent $CH_4$ The reaction of ethanol with water vapor on the same contact catalyst resulted, at 300° C., in a gas which, after the condensation of the water content, consists of 59 mol percent $H_2$
7 mol percent CO
14 mol percent $CO_2$
20 mol percent $CH_4$

We claim:

1. The process of producing hydrogen by the catalytic vapor reformation of hydrocarbons, which comprises contacting said hydrocarbon, at a temperature between 600° and 800° C., with catalyst particles consisting of an aluminum-nickel alloy from which a few microns thickness of depth of aluminum had been dissolved away from the surface of the metal grains of the aluminum-nickel alloy by a potassium hydroxide solution and that the nickel is left in a catalytically active form, the alloy portion which is not attacked by the caustic solution serves as a carrier for the highly active nickel, and the adhering potassium hydroxide solution is washed off from the treated catalyst.

2. The process of claim 1, wherein the hydrocarbon is a saturated aliphatic hydrocarbon of from 1 to 3 carbon atoms.

3. The process of claim 2, wherein the saturated aliphatic hydrocarbon is methane.

4. The process of claim 1, wherein the alkali solution is aqueous KOH.

5. The process of claim 1, wherein the alkali solution is alcoholic KOH.

6. The process of claim 1, wherein about 5 microns depth of aluminum are dissolved away from the aluminum-nickel catalyst particles which have a grain diameter of from 1 to 5 mm.

7. The process of producing hydrogen by the catalytic vapor reformation of saturated aliphatic alcohols, which comprises contacting said alcohols, at a temperature of 300° to 400° C. with catalyst particles consisting of an aluminum-nickel alloy from which a few microns thickness of depth of aluminum had been dissolved away from the surface of the metal grains of the aluminum-nickel alloy by an alkali metal hydroxide solution and that the nickel is left in a catalytically active form, the alloy portion which is not attacked by the caustic solution serves as a carrier for the highly active nickel, and the adhering alkali metal hydroxide solution is washed off from the treated catalyst.

8. The process of claim 7, wherein about 5 microns depth of aluminum are dissolved away from the aluminum-nickel catalyst particles which have a grain diameter of from 1 to 5 mm.

9. The process of claim 7, wherein the aliphatic alcohol is of from 1 to 3 carbon atoms.

10. The process of claim 9, wherein the alcohol is methanol.

References Cited

UNITED STATES PATENTS

| 2,928,891 | 3/1960 | Justi et al. | 252—466 XR |
| 3,119,667 | 1/1964 | McMahon. | |
| 3,139,408 | 6/1964 | Tumer et al. | 252—466 |
| 3,235,513 | 2/1966 | Jung et al. | 252—466 |

FOREIGN PATENTS

| 628,405 | 8/1949 | Great Britain. |
| 655,007 | 1/1963 | Canada. |

EDWARD STERN, *Primary Examiner.*

U.S. Cl. X.R.

252—373, 466

UNITED STATES PATENT OFFICE
CERTIFICATE OF CORRECTION

Patent No. 3,454,364　　　　　　　　　　　　　　　　　July 8, 196

Ferdinand v. Sturm et al.

It is certified that error appears in the above identified patent and that said Letters Patent are hereby corrected as shown below:

In the heading to the printed specification, line 9, "395,939" should read -- S 95,939 --.

Signed and sealed this 28th day of April 1970.

(SEAL)
Attest:

Edward M. Fletcher, Jr.　　　　　　　　　　　　WILLIAM E. SCHUYLER, JR.
Attesting Officer　　　　　　　　　　　　　　　　　Commissioner of Patents